No. 893,655. PATENTED JULY 21, 1908.
C. L. REMPES.
CUSHION TIRE.
APPLICATION FILED AUG. 6, 1906.

Witnesses.
E. B. Gilchrist
H. P. Sullivan

Inventor
Charles L. Rempes
by
Thurston Woodward

UNITED STATES PATENT OFFICE.

CHARLES L. REMPES, OF AKRON, OHIO.

CUSHION-TIRE.

No. 893,655.

Specification of Letters Patent.

Patented July 21, 1908.

Application filed August 6, 1906. Serial No. 329,418.

*To all whom it may concern:*

Be it known that I, CHARLES L. REMPES, a citizen of the United States, residing at Akron, in the county of Summit and State of Ohio, have invented a certain new and useful Improvement in Cushion-Tires, of which the following is a full, clear, and exact description.

The object of the present invention is to provide an improved cushion tire, and one especially designed for use on automobiles.

It is of course well known that the chief reason for employing pneumatic, in preference to solid, tires, is the fact that solid tires are not sufficiently elastic. This lack of resiliency not only affects the degree of comfort of the user, but also transmits jars to the mechanism of the machine and limits the life of the tire by reason of the fact that it does not yield readily in passing over obstructions and consequently it becomes nicked and cut. Pneumatic tires are, however, exceedingly expensive not only by reason of their first cost but because of their inability to stand up under the wear and tear and the punctures constantly received. Furthermore they are a source of great annoyance to the user by reason of the trouble necessary to remove them from the wheels for repair or replacement. The form of tire, which I have invented, however, is not only as resilient as a pneumatic tire, but is as independent of punctures as a solid tire and can be removed or applied with the greatest ease.

Figure 1:
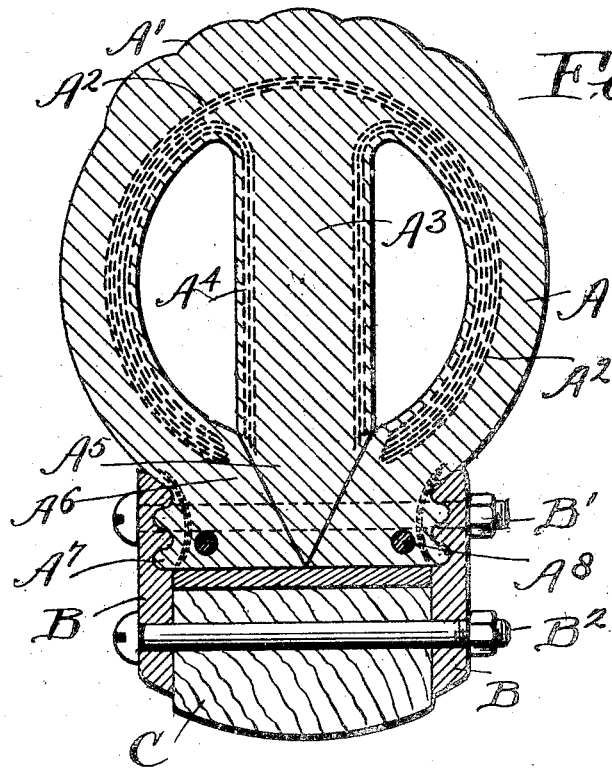
Figure 2:
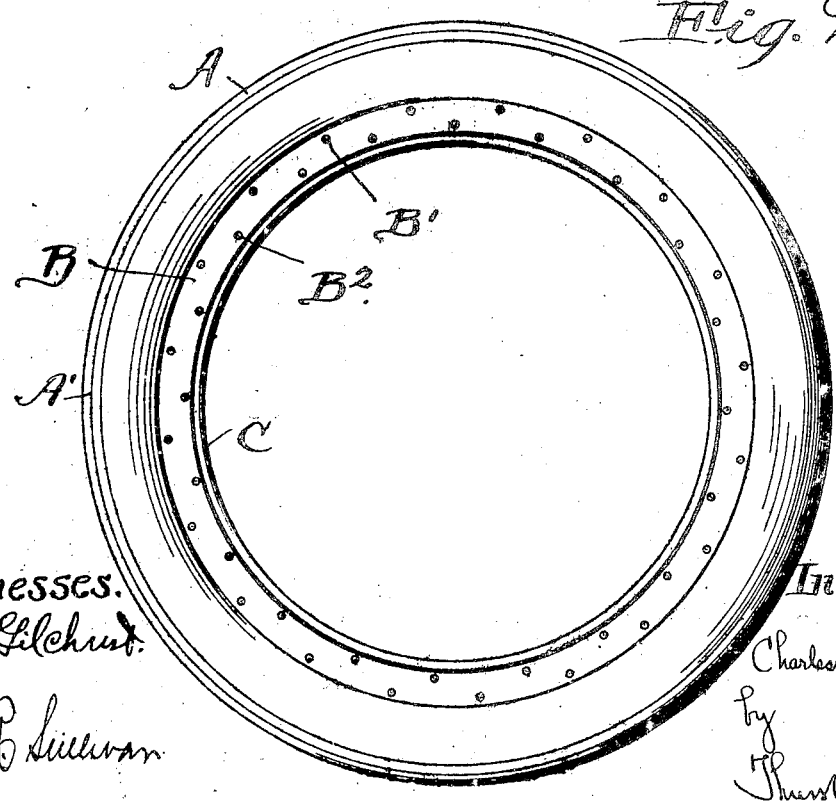

Referring to the accompanying drawings, which illustrate an embodiment of my invention, Figure 1 is a section of a tire constructed according to the principles of my invention showing its internal structure and also showing the manner of applying the same to a vehicle wheel. Fig. 2 is an elevation of the tire showing the manner of securing the clamping plates to the wheel.

The tire A which I have constructed is somewhat like the outer tube of a pneumatic tire, in that it is hollow and shell-like. It will be seen that the walls of the tire are of the usual shape, having corrugated bearing surface $A'$, and they are reinforced with suitable fabric $A^2$. Extending from the wall in the central plane of the tire is a thick rib $A^3$ from which rib the principal cushion action is obtained. I find it desirable to have reinforcing fabric $A^4$ along each wall of this central rib. This rib is, when first constructed, tapered or beveled at its apex $A^5$ and shaped to fit between the edges $A^6$ of the side walls of the tire as indicated in the drawings. This construction of tire is one which is, obviously, easily built up, the center of the rib being formed of stock while the rest of it together with the walls are built up in layers. When the building up process is finished the tire is then cured, two cores being placed on the sides of the rib between it and the walls of the body. The edges of the walls and the apex of the rib are kept spaced apart during the curing. After curing, the cores are removed and the beveled apex of the rib is cemented to the edges. The space formed by the cores is thus air-tight, and, with the natural pressure of air confined therein, becomes semi-pneumatic.

Referring to Fig. 1, it will be noted that there are reinforced corrugations $A^7$ on the inner circumference of the wheel which are adapted to fit in clamping plates B which are of steel or other suitable material and which are bolted to the felly of the wheel. These clamping plates, of which I provide one on each side, may be applied to any ordinary metal-rimmed wheel, as the one shown in the drawings, since the tire and clamping plates are applied to the wheel by placing the tire directly upon the metal tire of the wheel and passing bolts $B'$ through the clamping plates and the tire and bolts $B^2$ through the clamping plates and felly of the wheel. In addition to the securing means comprised in the corrugations noted, and the bolts, I provide endless steel wires $A^8$ embedded in the rubber in such position that they are immediately under and against the bolts $B'$ which secure the cushion tire to the clamping plates. It will be seen by this construction, the tire can be placed on any wheel of the proper diameter without having a special tire made for the purpose. Furthermore, should it at any time be desired to remove the tire from the wheel, this can be accomplished by the use of an ordinary hand wrench, or in the event that the bolts are screw-bolts, then by a hand wrench and screw driver. This feature of construction is of the greatest value in automobile use.

I am aware that there have been other cushion tires constructed with the ribs designed to act as cushions, but I am not aware of any construction in which it has been found possible to build up the parts in the simple manner described, and at the same time, secure resiliency in action, and I will particularly call attention to this as there are a great number of built-up cushion tires, some of which are more or less effective in use, but which are of such structure that an economical and practical manufacture is out of the question and they frequently in curing become practically solid tires by reason of the cavities filling up with the soft rubber.

It is evident that certain modifications in the details of the structure may be made without departing from the spirit of the broad invention which I have described, and I do not desire therefore, to be limited in any other manner than to the broad invention described and claimed.

Having thus described my invention, I claim:

1. A cushion tire comprising a shell having outer members with reinforced annularly corrugated edges and a central, radially-extending reinforced supporting rib formed integral with the central portion of said shell; said rib having a wedge shaped inner edge projecting between the inwardly turned edges of outer members; substantially as described.

2. In combination, a wheel having peripheral side extensions with inner corrugated faces, a tire having lateral extensions with corrugations to receive the corresponding corrugations of the side extensions of the wheel, retaining rings embedded in the lateral extensions of the tire, a diametrical supporting rib formed integral with the inner intermediate portion of the tread of the tire and having a wedge-shaped edge projecting between the inwardly turned lateral extensions of the tire, bolts securing the side extensions to the wheel felly and bolts passing through said side extensions and the lateral extensions of the tire outside the retaining rings; substantially as described.

In testimony whereof, I hereunto affix my signature in the presence of two witnesses.

CHARLES L. REMPES.

Witnesses:
J. R. VAUGHAN,
JOEL G. PHIPPS.